(12) United States Patent
Hirano et al.

(10) Patent No.: US 9,776,662 B2
(45) Date of Patent: Oct. 3, 2017

(54) SUB-FRAME STRUCTURE

(71) Applicant: HONDA MOTOR CO., LTD., Minato-ku, Tokyo (JP)

(72) Inventors: Masataka Hirano, Wako (JP); Tetsuya Miyahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/107,076

(22) PCT Filed: Dec. 25, 2014

(86) PCT No.: PCT/JP2014/084317
§ 371 (c)(1),
(2) Date: Jun. 21, 2016

(87) PCT Pub. No.: WO2015/099043
PCT Pub. Date: Jul. 2, 2015

(65) Prior Publication Data
US 2017/0036698 A1 Feb. 9, 2017

(30) Foreign Application Priority Data

Dec. 27, 2013 (JP) .................................. 2013-272126
Dec. 27, 2013 (JP) .................................. 2013-272135

(51) Int. Cl.
*B62D 21/11* (2006.01)
*B60K 5/12* (2006.01)

(52) U.S. Cl.
CPC ................ *B62D 21/11* (2013.01); *B60K 5/12* (2013.01); *B60K 5/1216* (2013.01)

(58) Field of Classification Search
CPC ...................... B62D 21/02–21/05; B62D 21/11
See application file for complete search history.

(56) References Cited

U.S. PATENT DOCUMENTS

| 4,453,740 A | * | 6/1984 | von der Ohe | ........... | B62D 21/11 180/311 |
| 4,753,315 A | * | 6/1988 | Fujisaki | ................. | B62D 21/11 180/292 |

(Continued)

FOREIGN PATENT DOCUMENTS

| CN | 1392078 A | 1/2003 |
| CN | 1792660 A | 6/2006 |

(Continued)

OTHER PUBLICATIONS

Office Action issued in the counterpart Japanese Patent Application 2015-554999, drafting date Mar. 28, 2017, with the English translation thereof.

(Continued)

*Primary Examiner* — Erez Gurari
(74) *Attorney, Agent, or Firm* — Carrier Blackman & Associates, P.C.; William D. Blackman; Joseph P. Carrier

(57) ABSTRACT

A sub-frame structure includes right and left side members extending in a vehicle front-rear direction, and a rear cross member extending in a vehicle width direction. The sub-frame structure is configured to support a vehicle power plant such as an engine through antivibration devices, and to be supported by a vehicle body frame. The right and left side members are rigidly fixed to a vehicle body frame through bolts. A first antivibration device is mounted on a front cross beam. First bushes and second bushes are provided in order to support the front cross beam in a floating manner relative to the right and left side members.

2 Claims, 11 Drawing Sheets

(56) References Cited

U.S. PATENT DOCUMENTS

| | | | | |
|---|---|---|---|---|
| 4,863,189 A * | 9/1989 | Lindsay | B62D 21/02 | 280/789 |
| 6,109,629 A * | 8/2000 | Bortz | B62D 21/11 | 280/124.109 |
| 6,109,654 A * | 8/2000 | Yamamoto | B62D 21/11 | 180/299 |
| 6,390,224 B1 * | 5/2002 | Yoshida | B62D 21/00 | 180/311 |
| 6,820,908 B1 * | 11/2004 | Tousi | F16F 15/08 | 248/609 |
| 6,869,090 B2 * | 3/2005 | Tatsumi | B60G 3/20 | 280/124.109 |
| 7,213,873 B2 * | 5/2007 | Murata | B62D 21/11 | 296/187.09 |
| 7,393,016 B2 * | 7/2008 | Mitsui | B62D 25/08 | 180/232 |
| 7,681,943 B2 * | 3/2010 | Murata | B62D 21/11 | 296/187.09 |
| 7,883,113 B2 * | 2/2011 | Yatsuda | B62D 21/11 | 180/232 |
| 8,540,261 B2 * | 9/2013 | Okamoto | B62D 21/11 | 280/124.109 |
| 8,641,066 B2 * | 2/2014 | Kudla | B62D 21/11 | 180/312 |
| 8,794,646 B1 * | 8/2014 | Onishi | B62D 21/155 | 280/124.109 |
| 9,010,849 B2 | 4/2015 | Komiya et al. | | |
| 9,096,276 B2 * | 8/2015 | Komiya | B62D 21/11 | |
| 9,150,250 B2 * | 10/2015 | Imanishi | B62D 21/11 | |
| 2004/0046381 A1 * | 3/2004 | Yoshida | B60G 99/00 | 280/784 |
| 2005/0116459 A1 * | 6/2005 | Ito | B62D 21/02 | 280/781 |
| 2006/0131932 A1 * | 6/2006 | Kiselis | B62D 3/08 | 296/204 |
| 2006/0219462 A1 * | 10/2006 | Martin | B62D 21/12 | 180/292 |
| 2007/0024044 A1 * | 2/2007 | Ogawa | B60G 3/20 | 280/788 |
| 2007/0169982 A1 * | 7/2007 | Ogawa | B60G 3/20 | 180/312 |
| 2011/0115258 A1 * | 5/2011 | Ohhama | B62D 21/11 | 296/193.07 |
| 2011/0308877 A1 * | 12/2011 | Hiruma | B60K 1/00 | 180/299 |
| 2012/0255804 A1 * | 10/2012 | Akoum | B60K 1/00 | 180/291 |
| 2013/0009375 A1 * | 1/2013 | Tanaka | B60G 7/02 | 280/124.109 |
| 2013/0026793 A1 * | 1/2013 | Wagner | B23K 26/28 | 296/203.01 |
| 2014/0145423 A1 * | 5/2014 | Isakiewitsch | B62D 21/11 | 280/781 |
| 2014/0152051 A1 * | 6/2014 | Saitou | B62D 21/15 | 296/187.09 |
| 2015/0291107 A1 * | 10/2015 | Jaynes | B62D 21/02 | 248/201 |
| 2016/0039464 A1 * | 2/2016 | Hirano | B62D 21/11 | 180/312 |
| 2016/0152272 A1 * | 6/2016 | Tomikuda | B62D 21/02 | 296/203.01 |

FOREIGN PATENT DOCUMENTS

| | | |
|---|---|---|
| CN | 203198721 U | 9/2013 |
| JP | H08-192641 A | 7/1996 |
| JP | 2000-238545 A | 9/2000 |
| JP | 2006-051839 A | 2/2006 |
| JP | 2010-234948 A | 10/2010 |
| JP | 2013-129222 A | 7/2013 |

OTHER PUBLICATIONS

Office Action issued Apr. 5, 2017 in the counterpart Chinese Patent Application 201480068534.6 with the English translation thereof.

* cited by examiner

● FIXED POINT (RIGID)

◎ FLOATING POINT $$f_o = \frac{1}{2\pi}\sqrt{\frac{k}{m}}$$

k : SPRING CONSTANT
m : MASS OF COMPONENT SUBJECT TO FLOATING (COMPARATIVE EXAMPLE)

(EMBODIMENT)

● FIXED POINT (RIGID)
◐ FLOATING POINT

SUB-FRAME STRUCTURE

TECHNICAL FIELD

The present invention relates to a sub-frame structure to be provided at a front part of a vehicle such as an automobile.

BACKGROUND ART

A vehicle such as an automobile is provided with a sub-frame, which is fixed to a front side frame as a vehicle body frame, equipped with suspension constituents such as a suspension arm and a stabilizer, and configured to support a vehicle power plant such as an engine and/or a motor through antivibration devices.

For example, as shown in FIG. 12, Patent Literature 1 discloses vibration-absorbing elastic bodies 1 made of rubber and configured to absorb vibrations occurring on a vehicle body. Each vibration-absorbing elastic body 1 is formed from two cylindrical elastic bodies 2a and 2b, and metallic discs 3a and 3b which are set below the two elastic bodies 2a and 2b, respectively. Here, in FIG. 12, reference numeral 4 denotes right and left brackets, reference numeral 5 denotes a cross member, and reference numeral 6 denotes stud bolts used to fix the vibration-absorbing elastic bodies 1 to the cross member 5, respectively.

CITATION LIST

Patent Literature

Patent Literature 1: JP 2000-238545 A

SUMMARY OF INVENTION

Technical Problem

However, when the vibration-absorbing elastic body 1 disclosed in Patent Literature 1 is provided on a sub-frame in order to cut off transmission of vibrations generated from a vehicle power plant such as an engine, a mass of each of the discs 3a and 3b serving as a mass component is relatively small, and it is difficult to drastically increase thicknesses and diameters of the discs 3a and 3b due to relations with the elastic bodies 2a and 2b. For this reason, the vibration-absorbing elastic body 1 disclosed in Patent Literature 1 has a problem that, in a well-known relation ($f=(1/2\pi)\sqrt{(k/m)}$) between a spring constant (k) and a mass (m) to define a resonance frequency (f), it is not possible to increase a vibration cutoff region in a resonance frequency characteristic thereof.

Meanwhile, there is also a demand for further improving an antivibration effect by use of an existing sub-frame structure body without changing a shape of an existing sub-frame and points of attachment to a vehicle body frame.

A general objective of the present invention is to provide a sub-frame structure which is capable of increasing a vibration cutoff region in a resonance frequency characteristic and further improving an antivibration effect by use of an existing sub-frame structure body.

Solution to Problem

To attain the above objective, a sub-frame structure according to the present invention includes: a longitudinal member extending in a vehicle front-rear direction; and a lateral member extending in a vehicle width direction, the sub-frame structure being configured to support a vehicle power plant through antivibration devices, and to be supported by a vehicle body frame, in which the longitudinal member is rigidly fixed to the vehicle body frame, at least one of the antivibration devices is mounted on the lateral member, and an elastic body is provided in order to support the lateral member in a floating manner relative to the longitudinal member.

According to the present invention, by supporting the lateral member, on which the antivibration device is mounted, in a floating manner through the elastic body, it is possible to achieve a vibration reduction effect that is similar to a case of supporting the entire sub-frame in a floating manner relative to the vehicle body frame.

In addition, in the sub-frame structure according to the present invention, the longitudinal member is attached in such a way as to be sandwiched by opposed surfaces of the lateral member.

According to the present invention, it is possible to adopt a stopper structure in which the longitudinal member comes into contact with the elastic body in the state of being sandwiched by the opposed surfaces of the lateral member, while not requiring a conventional separate plate to come into contact with the elastic body. Thus, the number of components can be reduced and assembly man-hour can be simplified.

Moreover, the sub-frame structure according to the present invention further includes an attachment bracket configured to attach at least one of the antivibration devices to the lateral member, in which another elastic body is provided between the attachment bracket and the lateral member in order to support the attachment bracket in a floating manner.

According to the present invention, it is possible to reduce vibration transmission to be transmitted from the vehicle power plant by using a total mass of the antivibration device and the attachment bracket as a mass component subject to floating. Moreover, it is possible to reduce a resonance frequency and to increase a vibration cutoff region. Furthermore, since the present invention is constructed by a simple structure in which another elastic body is provided between the attachment bracket and the lateral member. Thus, it is possible to readily use an existing sub-frame structure body.

Advantageous Effects of Invention

According to the present invention, it is possible to obtain a sub-frame structure, which is capable of increasing a vibration cutoff region in a resonance frequency characteristic and further improving an antivibration effect by use of an existing sub-frame structure body.

DESCRIPTION OF EMBODIMENTS

Figure 1:
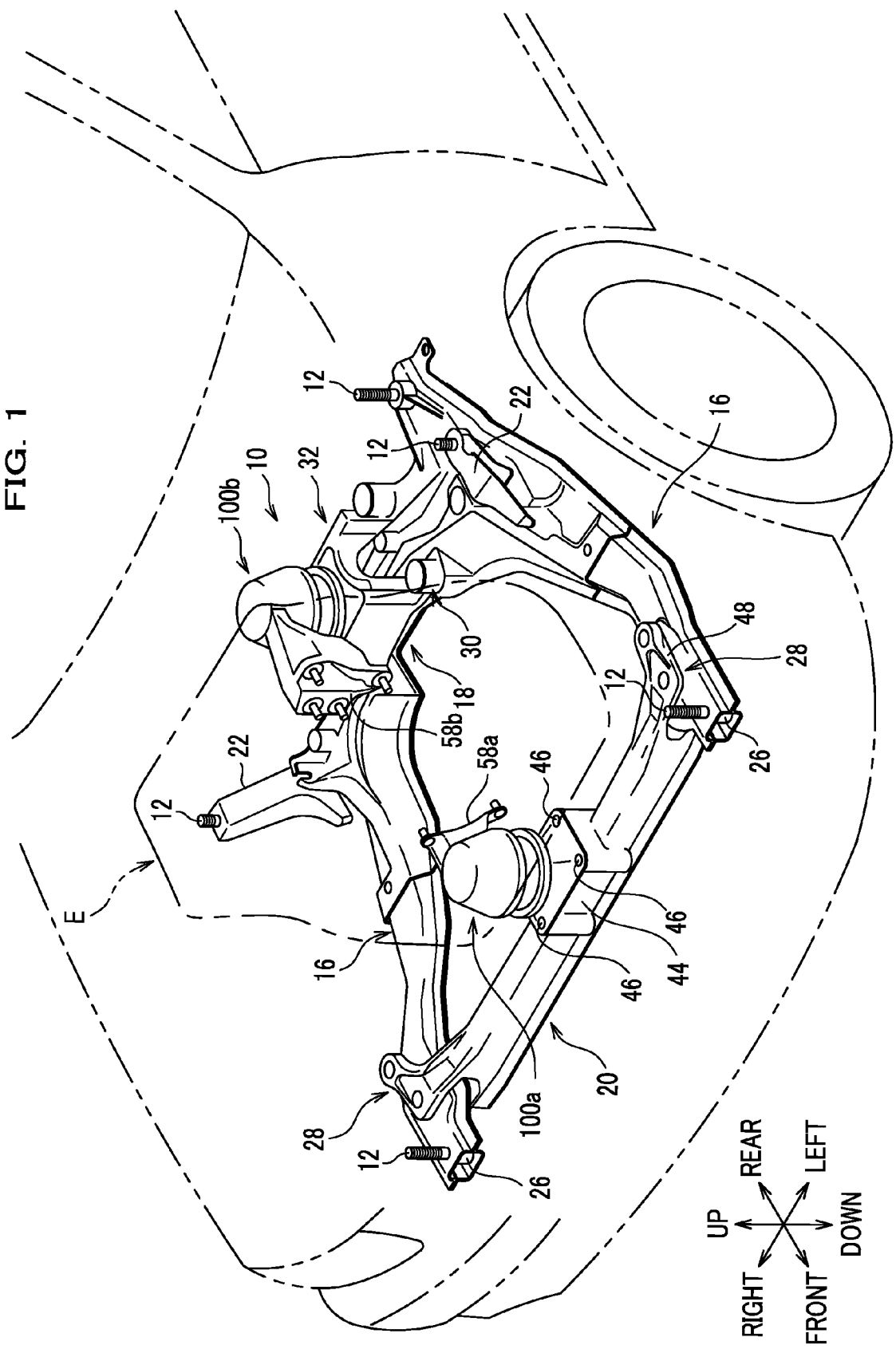
FIG. 1 is a transparent perspective view showing a state of providing a sub-frame structure body, which applies a sub-frame structure according to an embodiment of the present invention, at a front part of an automobile.
Figure 2:
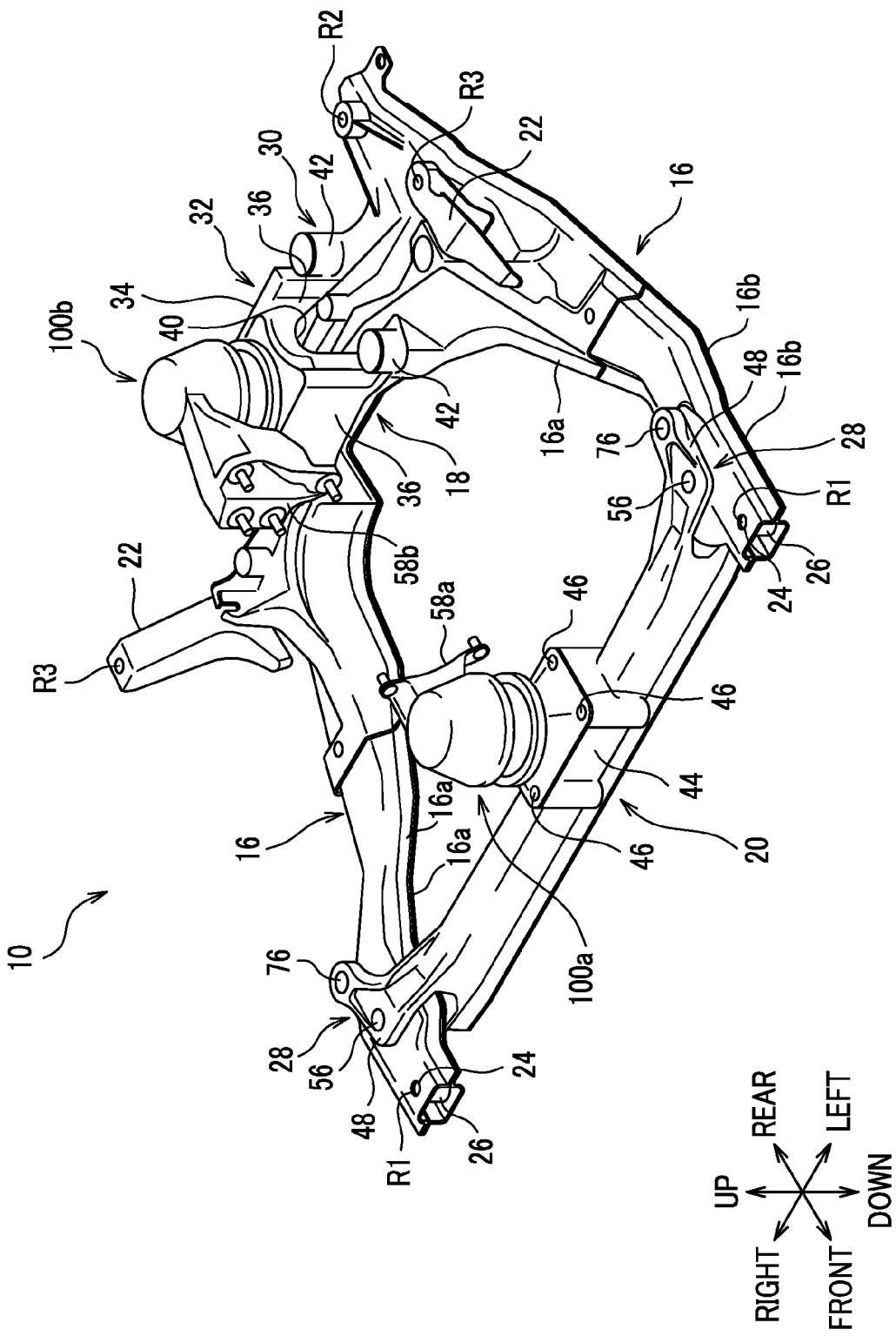
FIG. 2 is a perspective view of the sub-frame structure body shown in FIG. 1.
Figure 3:
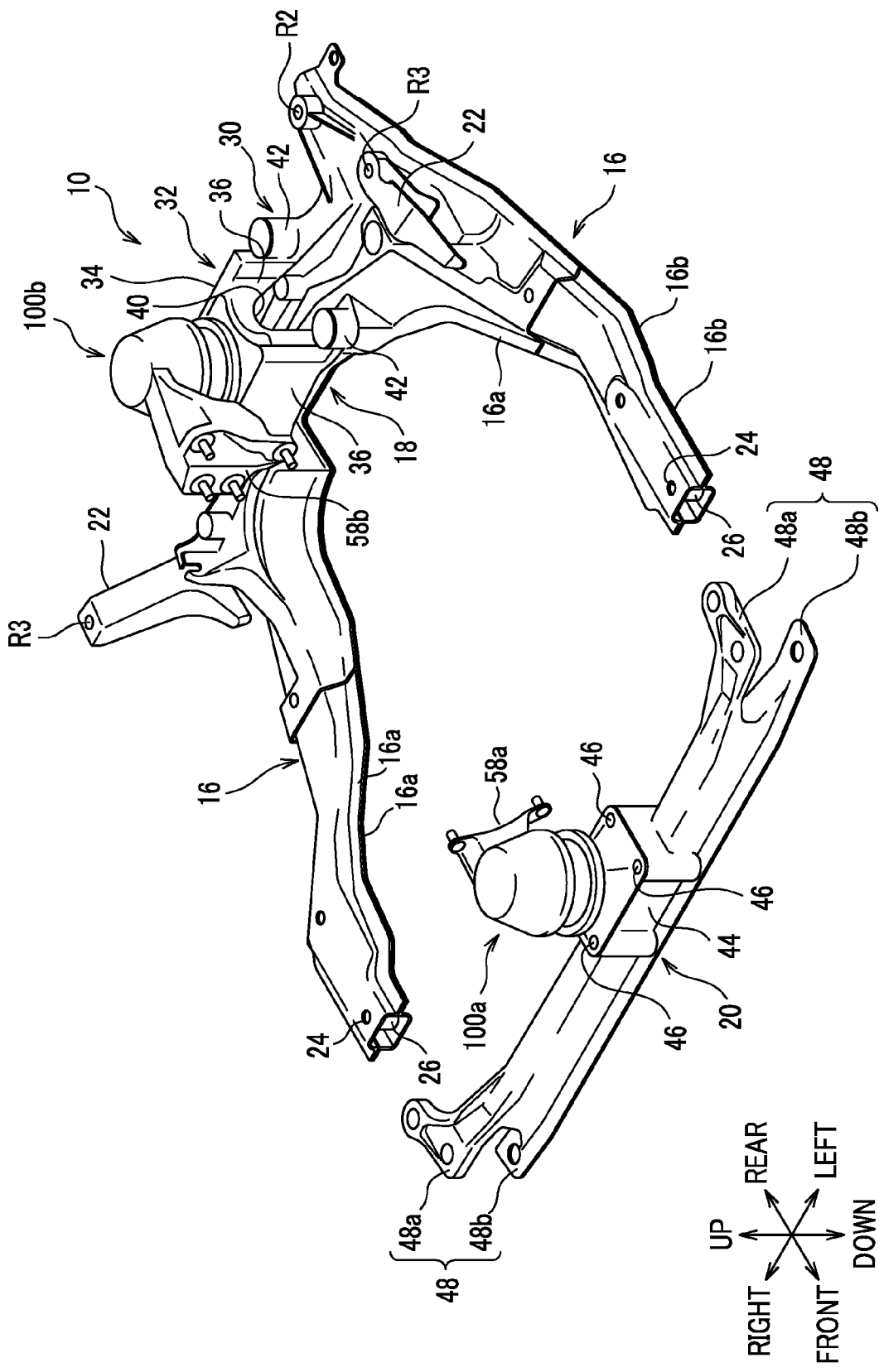
FIG. 3 is an exploded perspective view of the sub-frame structure body shown in FIG. 2.
Figure 4:
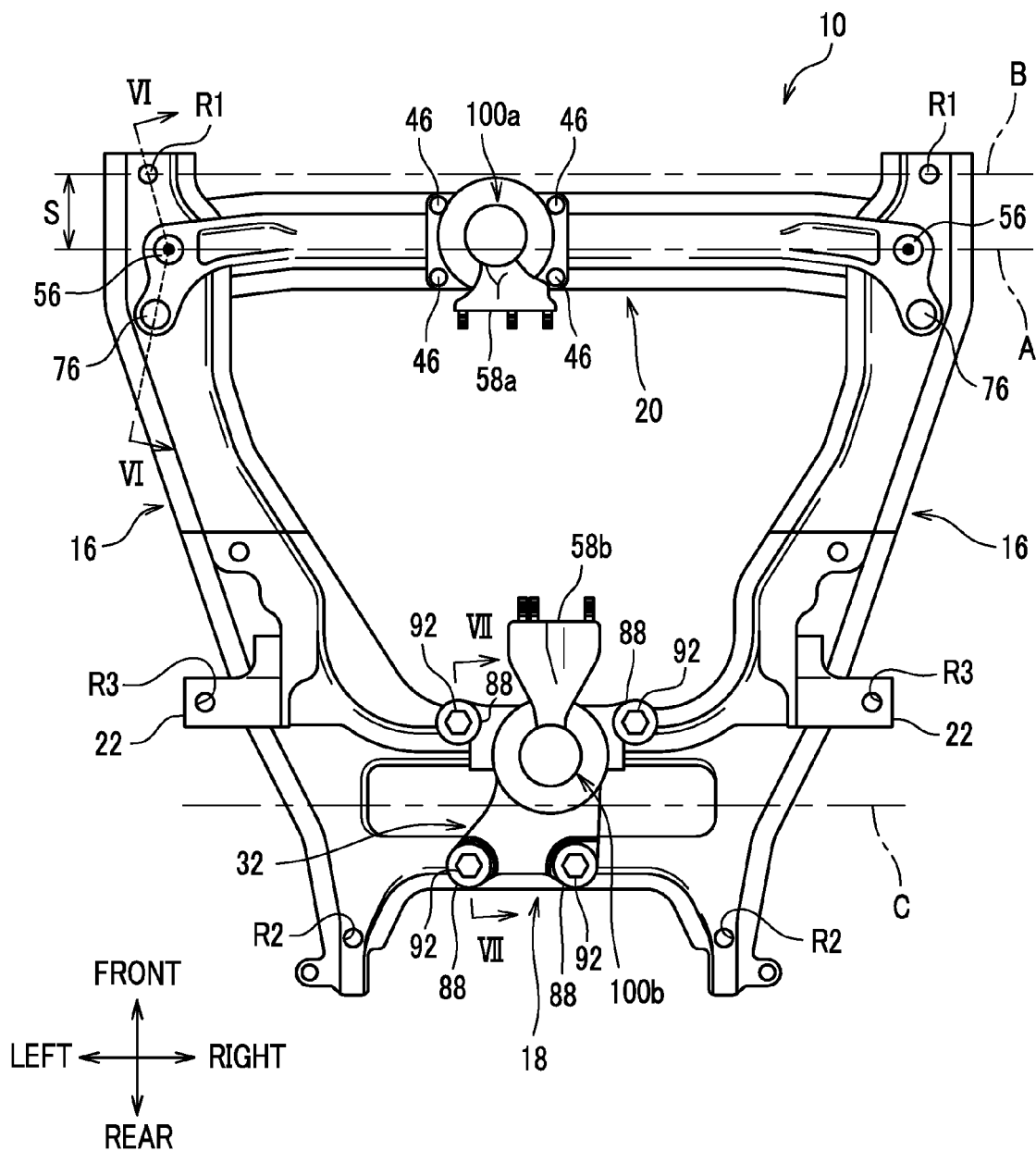
FIG. 4 is a plan view of the sub-frame structure body shown in FIG. 2.
Figure 5:
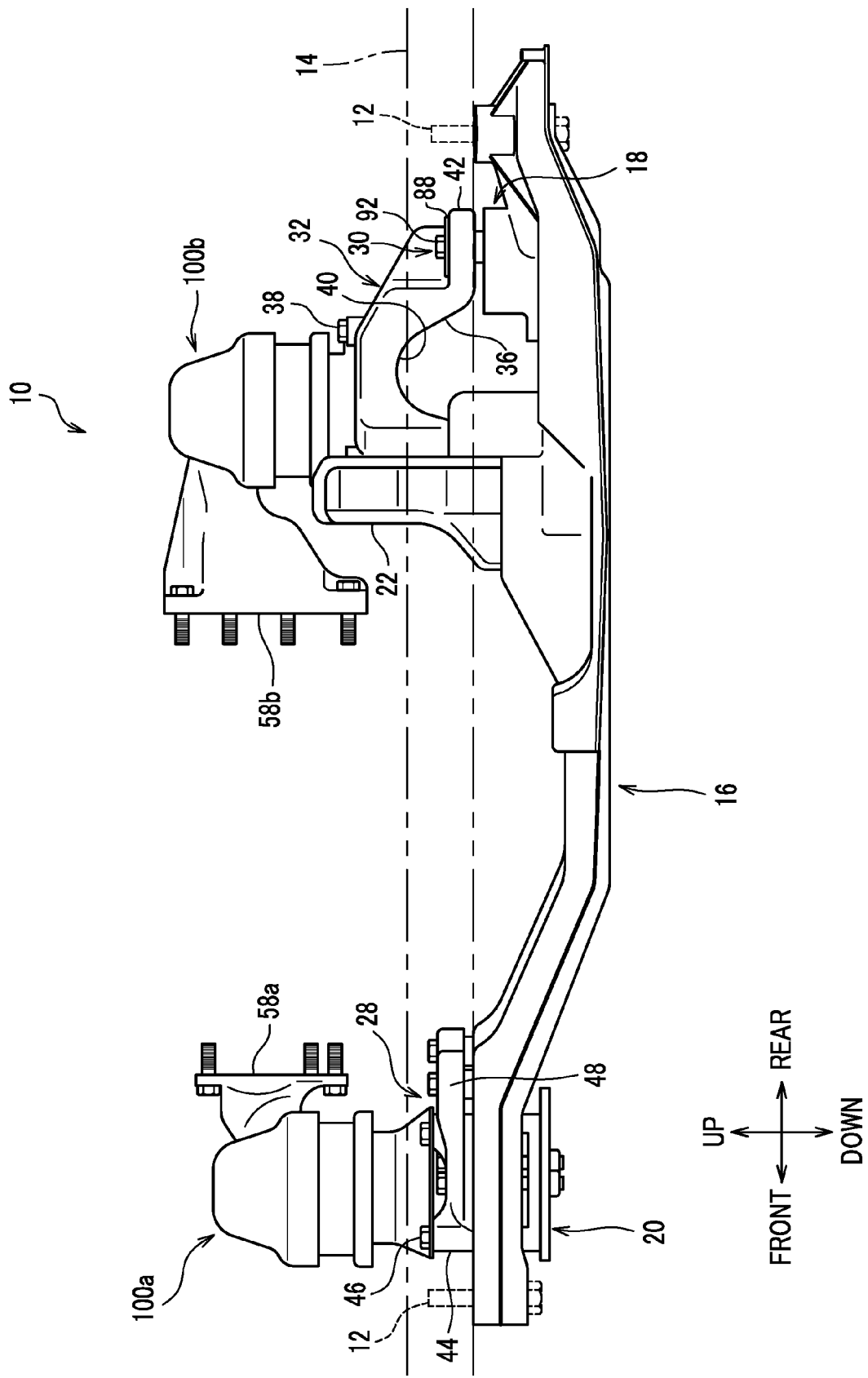
FIG. 5 is a side view of the sub-frame structure body shown in FIG. 2.

Next, an embodiment of the present invention will be described in detail with reference to the drawings as appropriate. FIG. 1 is a transparent perspective view showing a state of providing a sub-frame structure body, which applies a sub-frame structure according to the embodiment of the present invention, at a front part of an automobile. FIG. 2 is a perspective view of the sub-frame structure body shown in FIG. 1. FIG. 3 is an exploded perspective view of the sub-frame structure body shown in FIG. 2. FIG. 4 is a plan view of the sub-frame structure body shown in FIG. 2. FIG. 5 is a side view of the sub-frame structure body shown in FIG. 2. Note that the expressions "front-rear" and "up-down" indicated with arrows in the drawings represent a front-rear direction and a vertical direction of a vehicle while the expression "right-left" represents a right-left direction (a vehicle width direction) viewed from a driver's seat, respectively.

As shown in FIG. 1, a sub-frame structure body 10 applying the sub-frame structure according to the embodiment of the present invention is located at a front part of a vehicle body, and is rigidly fixed to a vehicle body frame (a side frame) 14 (see FIG. 5) through multiple bolts 12 that protrude vertically upward.

The sub-frame structure body 10 is formed from a pair of right and left side members (longitudinal members) 16, a rear cross member (a lateral member) 18, and a front cross beam (another lateral member) 20. Here, although the pair of right and left side members 16 and the rear cross member 18 are integrally formed in this embodiment, the present invention is not limited only to this configuration. For example, two end portions in an axial direction of the rear cross member 18 may be bonded by welding to vehicle rear side portions of the pair of right and left side members 16, for example.

The pair of right and left side members 16 are each formed from a rigid hollow member made of steel or the like, and are located line-symmetrically while being opposed to each other. The side members 16 extend in a vehicle front-rear direction, and are located at a left side portion and a right side portion in the vehicle width direction, respectively. As shown in FIG. 2, an inner flange 16a and an outer flange 16b are provided on an inner side and an outer side of each side member 16, respectively. Then, the vertically stacked inner flanges 16a and 16a are joined integrally with each other by means of well-known friction stir welding, for example, and so are the vertically stacked outer flanges 16b and 16b.

Meanwhile, the respective side members 16 are provided with multiple fixed points R to fix the respective side members 16 rigidly to the vehicle body frame 14. The multiple fixed points R include six fixed points R in total, namely, a pair of first fixed points R1 provided at vehicle front end portions of the respective side members 16, a pair of second fixed points R2 provided at vehicle rear end portions of the respective side members 16, and a pair of third fixed points R3 provided at upper end portions of stays 22 attached to intermediate portions between the vehicle front end portions and the vehicle rear end portions of the respective side members 16 (see • in FIG. 9 to be described later).

Figure 6:
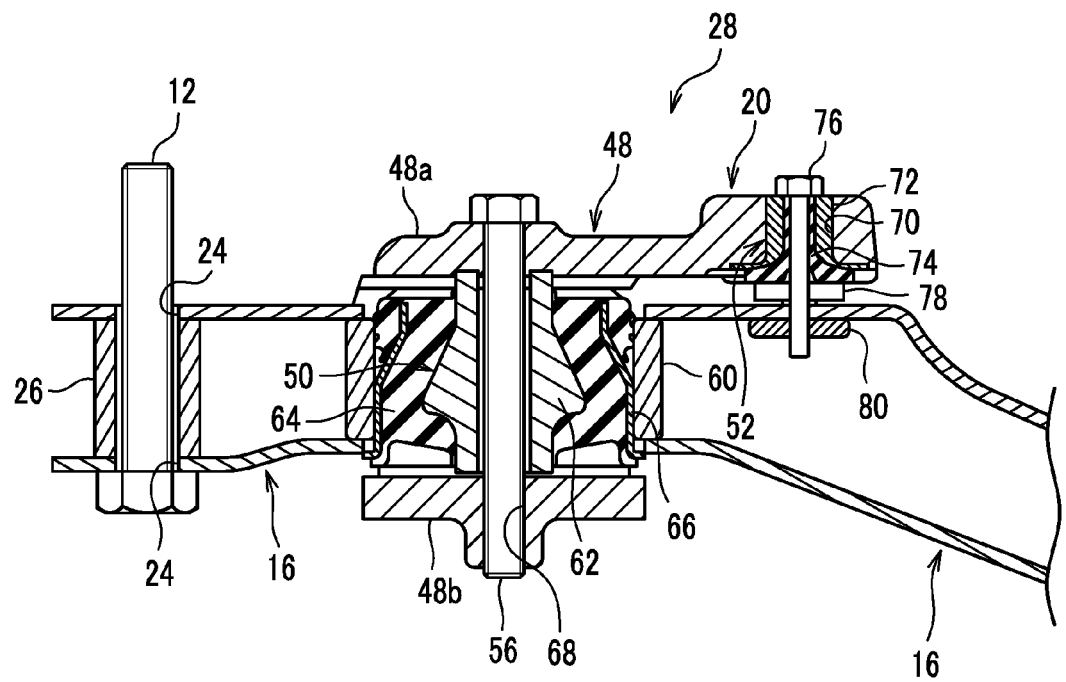
FIG. 6 is a vertical cross-sectional view taken along the VI-VI line in FIG. 4.

As shown in FIG. 6 to be described later, the first fixed point R1 provided at the vehicle front end portion of each side member 16 is formed, for example, from the bolt that functions as fixing means, fastening holes 24 formed in an upper wall and a lower wall into which the bolt 12 is inserted, and a cylindrical body 26 connected between the upper wall and the lower wall and configured to allow penetration of the bolt 12 therethrough.

Note that the first to third fixed points R1 to R3 mentioned above are brought about by applying existing fastening points provided on a conventional sub-frame without any change, and the configuration of the multiple fixed points R is not limited only to the locations and the quantities exemplified by the first to third fixed points R1 to R3.

The rear cross member 18 extends in the vehicle width direction and is integrally joined to the end portions in the vehicle rear side of the pair of right and left side members 16. To a substantially central part in the vehicle width direction of the rear cross member 18, an attachment bracket 32 is floatably attached through a second floating mechanism 30 to be described later.

Figure 7:
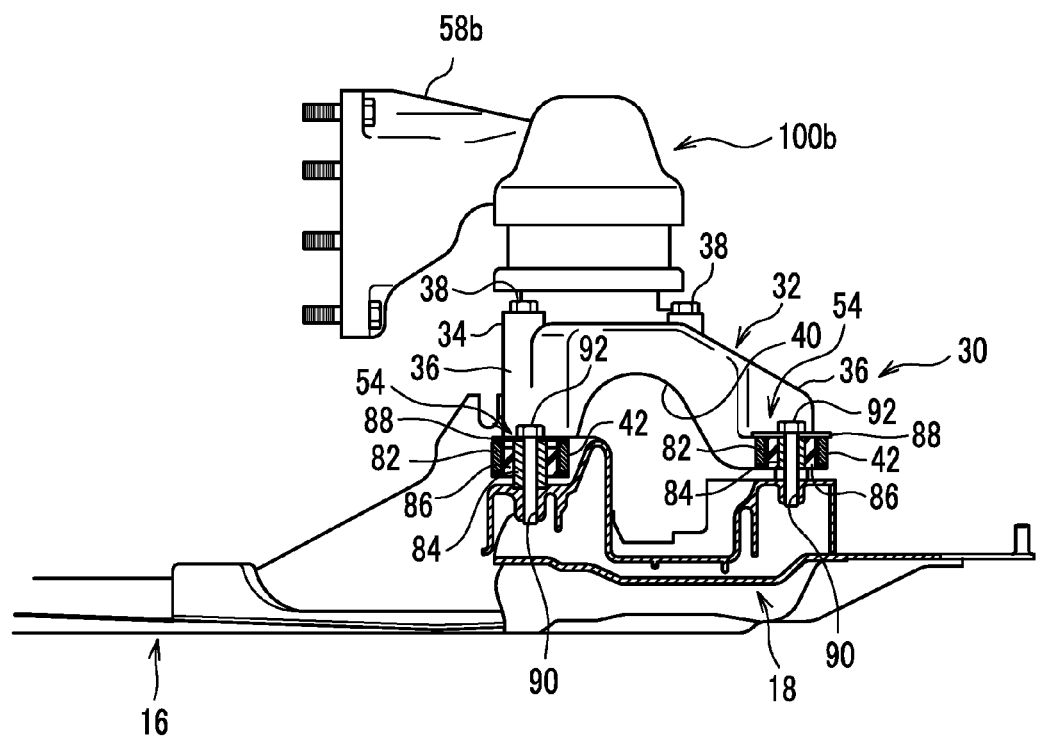
FIG. 7 is a vertical cross-sectional view taken along the VII-VII line in FIG. 4.

As shown in FIG. 7, the attachment bracket 32 is formed from a support fixation unit 34 and a leg unit 36. The support fixation unit 34 has a mounting surface on which a second antivibration device 100b to be described later is mounted. The second antivibration device 100b is supported and fixed onto the mounting surface through bolts 38. The leg unit 36 continues below the support fixation unit 34 and is floatably attached to an upper surface of the rear cross member 18. The leg unit 36 is formed in such a way as to cross a center line C of the rear cross member 18, which extends in the vehicle width direction in a plan view, in the vehicle front-rear direction (see FIG. 4), and to branch off in the vehicle front-rear direction through a recess 40 that is curved in a side view (see FIG. 5). Four annular bodies 42 are provided at a lower end portion of the leg unit 36, and third bushes (other elastic bodies) 54 constituting the second floating mechanism 30 to be described later are fitted into hole portions of the four annular bodies 42, respectively.

Back to FIG. 1 and FIG. 2, the front cross beam 20 extends in the vehicle width direction, and is floatably supported by the end portions in the vehicle front side of the pair of right and left side members 16 through first floating mechanisms 28 to be described later. The front cross beam 20 is formed from a rigid hollow member made of steel or the like, which is manufactured separately from the pair of right and left side members 16 and from the rear cross member 18.

A mount portion 44 bulging upward and allowing a first antivibration device 100*a* that will be described later to be mounted thereon is provided on a portion of an upper surface of the front cross beam 20, the portion being located substantially at the center in the vehicle width direction. The mount portion 44 is formed from a substantially rectangular flat surface in a plan view, and four bolt insertion holes (not shown) are formed at four corners thereof. The first antivibration device 100*a* can be rigidly fixed to the front cross beam 20 by inserting and fastening bolts 46 into the bolt insertion holes, respectively.

Meanwhile, at each of two end portions in the vehicle width direction of the front cross beam 20, there is provided a fork piece 48 that branches off in the middle of the hollow member vertically into an upper piece 48*a* and a lower piece 48*b*. The fork piece 48 includes two mutually opposed surfaces, which sandwich an end portion on the vehicle front side of each side member 16 by being fastened with a bush fastening bolt 56 to be described later.

The sub-frame structure body 10 is provided with the first antivibration device 100*a* which supports a vehicle front side of an engine (a vehicle power plant) E through an attachment bracket 58*a*, and the second antivibration device 100*b* which supports a vehicle rear side of the engine E through an attachment bracket 58*b*. The first antivibration device 100*a* is rigidly fixed to the mount portion 44 of the front cross beam 20 through the multiple bolts 46. The second antivibration device 100*b* is floatably supported with respect to the rear cross member 18 through the attachment bracket 32.

The first antivibration device 100*a* and the second antivibration device 100*b* are formed of the same configuration and each constructed as an active antivibration device, which exerts an active or offsetting antivibration effect on a vibrating target to be subjected to antivibration by adding vibrations with a driving unit 141 to be described later. The configurations of the first antivibration device 100*a* and the second antivibration device 100*b* will be described later in detail.

As shown in FIG. 6, the first floating mechanisms 28 are provided in regions on the two end portion sides in the vehicle width direction of the front cross beam 20, where the end portions in the vehicle front side of the side members 16 are vertically sandwiched by the fork pieces 48 of the front cross beam 20. The first floating mechanisms 28 are configured to support the front cross beam 20 and the first antivibration device 100*a* in a floating manner as mass components thereof.

Each first floating mechanism 28 is formed from a first bush (an elastic body) 50 and a second bush (an elastic body) 52, which are located away from each other by a predetermined distance substantially in the vehicle front-rear direction. As described later, the first bush 50 and the second bush 52 function as floating points F1 and F2 (see FIG. 9).

The first bush 50 is provided inside a cylindrical body 60, which joins the upper wall and the lower wall of each side member 16. The first bush 50 includes: an inner cylinder 62 made of a metal; a substantially cylindrical first elastic member 64 made of rubber, which is vulcanized and attached to an outer peripheral surface of the inner cylinder 62; an outer cylinder 66 made of a metal, part of which covers an outer peripheral surface of the first elastic member 64 and the rest of which is buried in the first elastic member 64; and the long bush fastening bolt 56, which penetrates the inner cylinder 62 as well as the fork piece 48 of the front cross beam 20, and is fastened to a screw hole 68 provided in the lower piece 48*b* of the fork piece 48. Here, the outer cylinder 66 may be replaced by a plate spring.

The second bush 52 includes: an outer cylinder 72 to be fitted into a through-hole 70 formed in the upper piece 48*a* of the fork piece 48 of the front cross beam 20; a second elastic member 74 formed into a thin and substantially cylindrical body with a smaller diameter than that of the first elastic member 64; a disc washer 78 located below the upper piece 48*a* and interposed between a lower surface (a stopper surface) of the second elastic member 74 and an upper surface of the upper wall of each side member 16; and a short bush fastening bolt 76, which penetrates the second elastic member 74 and is fastened to a disc member 80 provided on the upper wall side of each side member 16.

Here, as shown in FIG. 4, a virtual line A connected between the centers of the bush fastening bolts 56 of the first bushes 50 provided to the pair of right and left side members 16, respectively, is set at such a position offset by a predetermined distance S rearward of the vehicle with respect to a virtual line B connected between the first fixed points R1 to be rigidly fixed to the vehicle frame 14. By setting the virtual line A at the position offset by the predetermined distance S rearward of the vehicle as described above, the first floating mechanisms 28 can be easily arranged without changing the fixed points to a conventional vehicle body frame. The virtual line A connected between the centers of the bush fastening bolts 56 of the first bushes 50 coincides with the center line of the front cross beam 20.

The second floating mechanism 30 is provided substantially at the central part in the vehicle width direction of the rear cross member 18, which is a region where the leg unit 36 of the attachment bracket 32 supporting the second antivibration device 100*b* is attached to the rear cross member 18. The second floating mechanism 30 is configured to support the second antivibration device 100*b* and the attachment bracket 32 in a floating manner as mass components thereof.

The second floating mechanism 30 is formed from the four third bushes 54 having the same structure and fitted into the hole portions of the four annular bodies 42 of the leg unit 36, respectively. As described later, the four third bushes 54 function as floating points F3.

As shown in FIG. 7, each third bush 54 includes: an outer cylinder 82; an inner cylinder 84; a cylindrical bush 86 which is interposed between the outer cylinder 82 and the inner cylinder 84, and is vulcanized and attached to an inner peripheral surface of the outer cylinder 82 and to an outer peripheral surface of the inner cylinder 84, respectively; a disc washer 88 provided on an upper surface of the corresponding annular body 42; and a bush fastening bolt 92 which penetrates the disc washer 88 and the inner cylinder 84, and is fastened to a screw portion 90 provided on an inner wall of the rear cross member 18.

Figure 8:
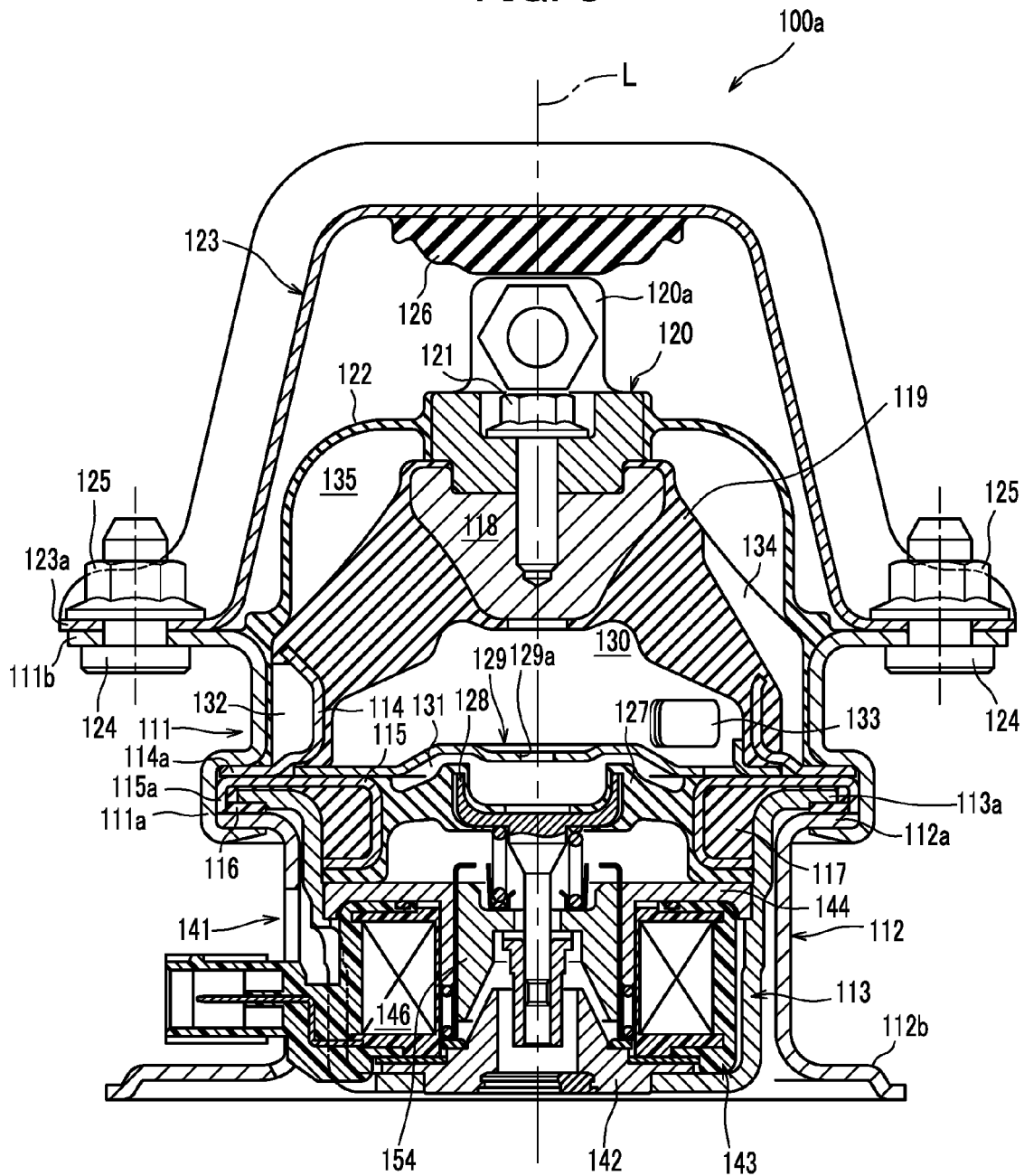
FIG. 8 is a vertical cross-sectional view showing a schematic configuration of a first antivibration device mounted on the sub-frame structure body shown in FIG. 2.

Next, structures and operations of the antivibration devices will be described. FIG. 8 is a vertical cross-sectional view showing a schematic configuration of the first antivibration device mounted on the sub-frame structure body shown in FIG. 2. Note that the first antivibration device 100*a* and the second antivibration device 100*b* are formed of the same configuration. Accordingly, the structure of the first antivibration device 100*a* will be described in detail and the description of the structure of the second antivibration device 100*b* will be omitted herein. Although the first antivibration device 100*a* shown in FIG. 8 adopts a liquid seal method, the present invention is not limited only to the foregoing. Moreover, although each antivibration device is preferred to be an active antivibration device, the present invention is not limited only to the foregoing.

As shown in FIG. 8, the first antivibration device 100a has a substantially axisymmetric structure with respect to an axial line L, and includes: a substantially cylindrical upper housing 111; a substantially cylindrical lower housing 112 located therebelow; an actuator case 113 housed in the lower housing 112 and having a substantially cup-like shape with an open upper surface; a diaphragm 122 connected to an upper side of the upper housing 111; an annular first rubber member support ring 114 housed in the upper housing 111; a first rubber member 119 connected to an upper side of the first rubber member support ring 114; an annular second rubber member support ring 115 housed in the actuator case 113; a second rubber member 127 connected to an inner peripheral side of the second rubber member support ring 115; the driving unit (an actuator) 141 housed in the actuator case 113 and located below the second rubber member support ring 115 and the second rubber member 127; and the like.

A flange portion 113a on the outer periphery of the actuator case 113, an outer peripheral portion 114a of the first rubber member support ring 114, and an outer surface outer peripheral portion 115a of the second rubber member support ring 115 provided with a vertically extending outer peripheral portion are stacked between a flange portion 111a at a lower end of the upper housing 111 and a flange portion 112a at an upper end of the lower housing 112, and are joined to one another by swaging.

At this time, an annular first floating rubber member 116 is interposed between the flange portion 112a and the flange portion 113a, and an annular second floating rubber member 117 is interposed between an upper surface of the flange portion 113a and a lower surface of the upper surface outer peripheral portion 115a of the second rubber member support ring 115. Thus, the actuator case 113 is supported in a floating manner to be relatively movable in the vertical direction with respect to the upper housing 111 and the lower housing 112.

The first rubber member support ring 114 and a first rubber member support boss 118, which is located inside a recess provided on an upper surface side of the first rubber member 119, are joined to each other by vulcanized attachment at a lower end and an upper end of the first rubber member 119 that is made of thick rubber. In the meantime, a diaphragm support boss 120 is fixed onto an upper surface of the first rubber member support boss 118 with a bolt member 121, and an outer peripheral portion of the diaphragm 122, of which inner peripheral portion is joined to the diaphragm support boss 120 by vulcanized attachment, is joined to the upper housing 111 by vulcanized attachment.

An engine attachment portion 120a is integrally formed on an upper surface of the diaphragm support boss 120, and is fixed to the engine E side. Meanwhile, a vehicle body side attachment portion 112b at a lower end of the lower housing 112 is fixed to the front cross beam 20. In the meantime, regarding the second antivibration device 100b, the vehicle body side attachment portion 112b at the lower end of the lower housing 112 is fixed to the attachment bracket 32.

A flange portion 123a at a lower end of a stopper member 123 is connected to a flange portion 111b at an upper end of the upper housing 111 by using a bolt 124 and a nut 125. The engine attachment portion 120a provided projecting from the upper surface of the diaphragm support boss 120 is located facing a stopper rubber member 126, which is attached to an upper inner surface of the stopper member 123, in such a way as to be capable of coming into contact with the stopper rubber member 126.

An outer peripheral portion of the second rubber member 127 formed from membrane rubber is joined to an inner peripheral surface of the second rubber member support ring 115 by vulcanized attachment. A movable member 128 is joined to a central part of the second rubber member 127 by vulcanized attachment in such a way that an upper portion of the movable member 128 is buried in the central part of the second rubber member 127.

Moreover, a disc partition wall member 129 is fixed between an upper surface of the second rubber member support ring 115 and a lower part of the first rubber member support ring 114. A first liquid chamber 130, which is defined by the first rubber member support ring 114, the first rubber member 119, and the partition wall member 129, and a second liquid chamber 131, which is defined by the partition wall member 129 and the second rubber member 127, communicate with each other through a communication hole 129a opened in the center of the partition wall member 129.

An annular communication passage 132 is formed between the first rubber member support ring 114 and the upper housing 111. The communication passage 132 communicates with the first liquid chamber 130 through a communication hole 133, and communicates with a third liquid chamber 135, which is defined by the first rubber member 119 and the diaphragm 122, through an annular communication clearance 134.

The driving unit 141 is formed from: a fixed core 142 mainly made of a metal or an alloy having a high magnetic permeability; a coil assembly 143 including a coil 146; a yoke 144; a movable core 154; and the like.

By magnetizing the coil 146 of the driving unit 141 by applying electricity thereto, the movable core 154 is attracted whereby the movable member 128 is moved downward. Along with the movement of the movable member 128, the second rubber member 127 defining the second liquid chamber 131 is deformed downward and a volume of the second liquid chamber 131 is hence increased. When the volume of the second liquid chamber 131 is increased, an incompressible fluid in the first liquid chamber 130 compressed by a push load from the engine E side flows into the second liquid chamber 131 through the communication hole 129a. As a consequence, it is possible to reduce the load transmitted from the engine E side to the vehicle body side (a vehicle cabin side).

On the other hand, when the coil 146 is demagnetized, the second rubber member 127 is deformed upward by its elastic force, whereby the movable member 128 and the movable core 154 move upward and the volume of the second liquid chamber 131 is reduced. When the volume of the second liquid chamber 131 is reduced, the incompressible fluid in the second liquid chamber 131 flows into the first liquid chamber 130, which is decompressed by a pull load from the engine E side, through the communication hole 129a. As a consequence, it is possible to reduce the load transmitted from the engine E side to the vehicle body side (the vehicle cabin side).

As described above, each of the first antivibration device 100a and the second antivibration device 100b is configured to function as the active antivibration device, in which an exciting force based on displacement drive by the driving unit 141 acts on the incompressible fluid sealed in the first liquid chamber 130, and vibrations inputted through the engine E are reduced actively or in an offsetting manner.

The sub-frame structure body 10 of this embodiment is basically configured as described above. Next, operation and effect of the sub-frame structure body 10 will be described.

Figure 9:
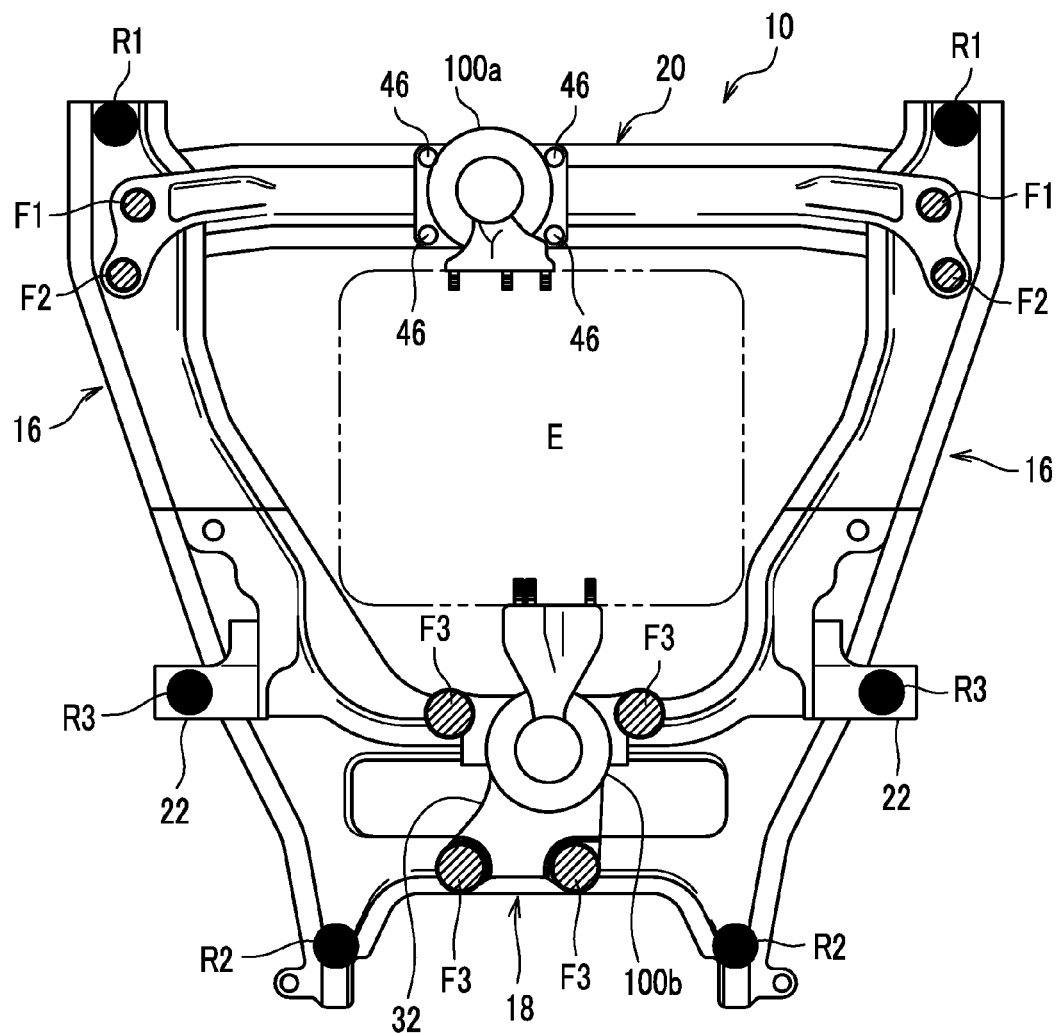
FIG. 9 is a schematic plan view showing an arrangement relation among fixed points and floating points of the sub-frame structure body shown in FIG. 2.
Figure 9:
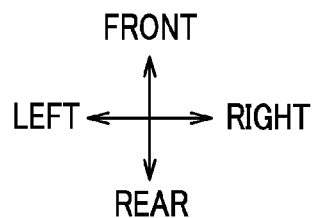

FIG. 9 is a schematic plan view showing an arrangement relation among the fixed points and the floating points of the sub-frame structure body shown in FIG. 2.

As shown in FIG. 9, in the sub-frame structure body 10 of this embodiment, the first to third fixed points R1 to R3 (six in total on the two sides) for rigidly fixing the sub-frame structure body 10 to the vehicle body frame are located away from one another by predetermined distances in the vehicle front-rear direction of the right and left side members 16 that are the longitudinal members. Moreover, there are provided the four floating points F1 and F2 to support the front cross beam 20 in a floating manner by using the first elastic members 64 in the first bushes 50 and the second elastic members 74 in the second bushes 52, which constitute the first floating mechanisms 28. Furthermore, there are provided the four floating points F3 to support the attachment bracket 32 and the second antivibration device 100b in a floating manner by using the cylindrical bushes 86 in the four third bushes 54, which constitute the second floating mechanism 30.

In other words, on the vehicle front side of the sub-frame structure body 10 of this embodiment, the vibrations inputted through the engine E are reduced actively or in an offsetting manner by the first antivibration device 100a fixed to the front cross beam 20, and there are also provided the first floating mechanisms 28 each of which includes the first bush 50 and the second bush 52 that are configured to support the front cross beam 20 in a floating manner relative to the corresponding side member 16. As a consequence, it is possible to achieve double vibration reduction effects (vibration transmission power reduction effects) on the vehicle front side of the sub-frame structure body 10 through actions of a vibration reduction function by the first antivibration device 100a and a vibration reduction function by the first floating mechanisms 28 in cooperation.

In addition, on the vehicle rear side of the sub-frame structure body 10, the vibrations inputted through the engine E are reduced actively or in an offsetting manner by the second antivibration device 100b provided to the rear cross member 18 through the attachment bracket 32, and there is also provided the second floating mechanism 30 which includes the third bushes 54 that are arranged between the attachment bracket 32 and the rear cross member 18 and are configured to support the attachment bracket 32 and the second antivibration device 100b in a floating manner. As a consequence, it is possible to achieve double vibration reduction effects (vibration transmission power reduction effects) on the vehicle rear side of the sub-frame structure body 10 through actions of a vibration reduction function (a vibration transmission power reduction function) by the second antivibration device 100b and a vibration reduction function (a vibration transmission power reduction function) by the second floating mechanism 30 in cooperation.

As described above, according to this embodiment, the double vibration reduction effects to reduce the vibrations inputted through the engine E with the respective cooperative actions are obtained in the vehicle front-rear direction on the whole sub-frame structure body.

Figure 10A:
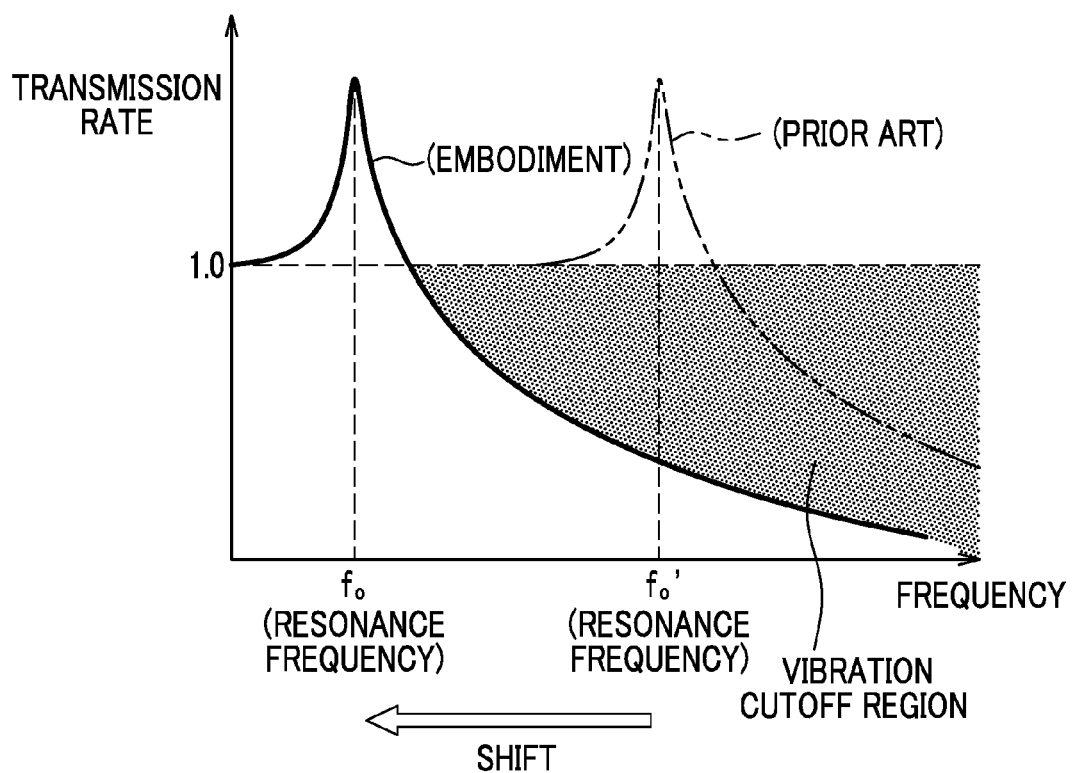
FIG. 10A is a characteristic diagram showing a relation between a frequency and a transmission rate of the sub-frame structure body shown in FIG. 2.
Figure 10B:
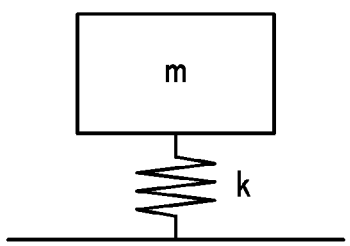
FIG. 10B is a schematic diagram showing a characteristic of a resonance frequency.

FIG. 10A is a characteristic diagram showing a relation between a frequency and a transmission rate of the sub-frame structure body shown in FIG. 2, and FIG. 10B is a schematic diagram showing a characteristic of a resonance frequency.

As shown in FIG. 10B, a resonance frequency ($f_0$) is obtained by:

$$f_0 = (1/2\pi)\sqrt{(k/m)} \qquad \text{(Formula 1).}$$

Figure 12:
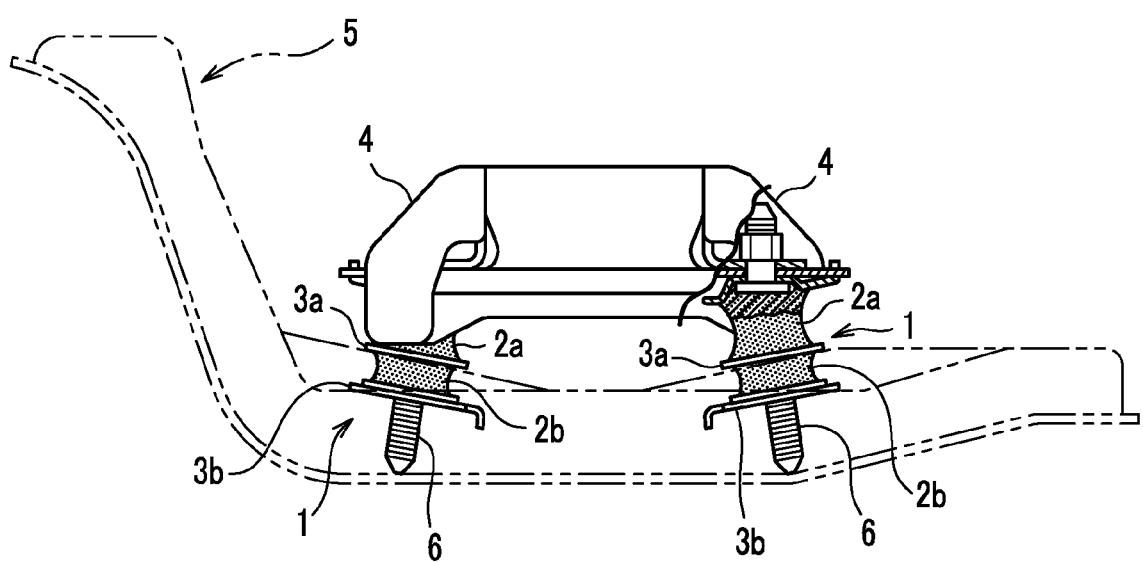
FIG. 12 is a cross-sectional view showing vibration-absorbing elastic bodies disclosed in Patent Literature 1.

In this case, according to the vibration-absorbing elastic body 1 (see FIG. 12) of Patent Literature 1, the mass of each of the discs 3a and 3b serving as the mass component (m) is relatively small, and it is difficult to drastically increase thicknesses and diameters of the discs 3a and 3b due to the relations with the elastic bodies 2a and 2b. For this reason, the vibration-absorbing elastic body 1 cannot increase the vibration cutoff region in the resonance frequency characteristic thereof.

On the other hand, in this embodiment, the first floating mechanism 28 located on the vehicle front side is configured to support the front cross beam 20 and the first antivibration device 100a in a floating manner as the mass components thereof. Meanwhile, the second floating mechanism 30 located on the vehicle rear side is configured to support the second antivibration device 100b and the attachment bracket 32 in a floating manner as the mass components thereof.

According to this embodiment, it is possible to increase the vibration cutoff region in the resonance frequency characteristic by significantly increasing the mass components as compared to those in the conventional configuration. In other words, the resonance frequency ($f_0$) can be reduced by increasing the value m (the mass component) in the above-described Formula 1, and the vibration cutoff region can be increased more than that in the conventional configuration by shifting a resonance frequency characteristic curve in a direction of an arrow in FIG. 10A.

Figure 11A:
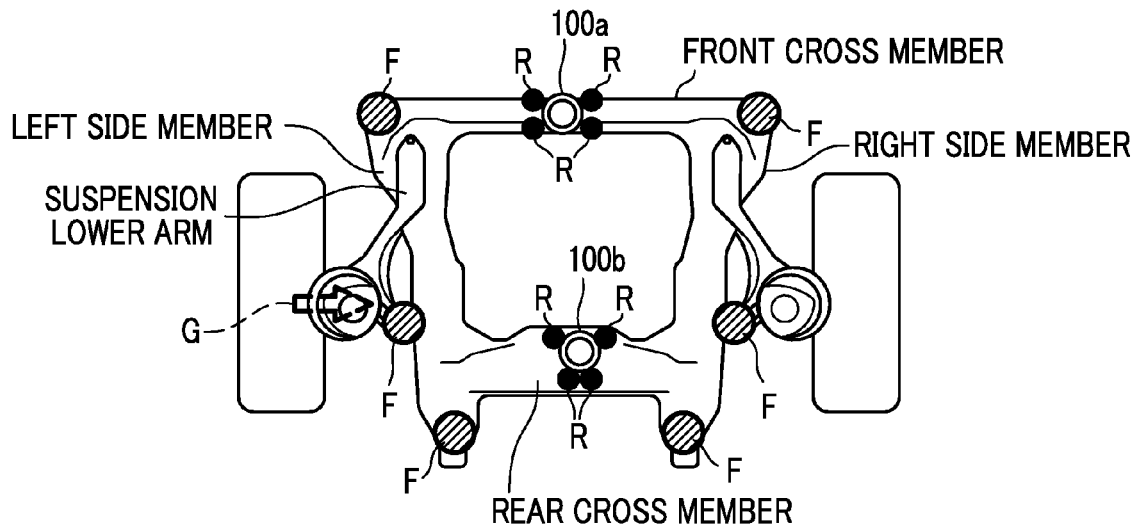
FIGS. 11A and 11B are explanatory diagrams provided for explaining a sub-frame structure body according to a comparative example worked out by the applicant of the present invention and the sub-frame structure body according to the embodiment, each being in a state where an input load is inputted from a suspension to the corresponding structure body.
Figure 11B:
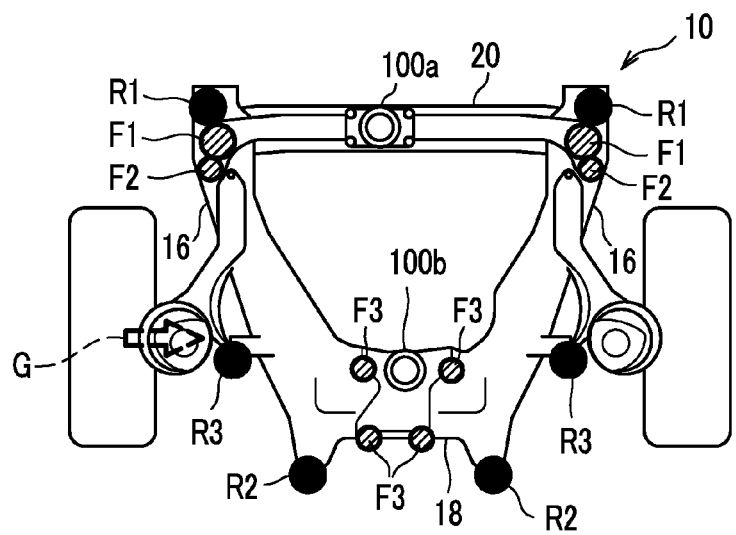

FIGS. 11A and 11B are explanatory diagrams provided for explaining a sub-frame structure body according to a comparative example worked out by the applicant of the present invention and the sub-frame structure body according to the embodiment, each being in a state where an input load is inputted from a suspension to the corresponding structure body.

As shown in FIG. 11A, the sub-frame structure body according to the comparative example adopts a parallel cross structure in which the front cross member and the rear cross member are formed integrally with the end portions in the vehicle front-rear direction of the right and left side members. In the comparative example, the sub-frame structure body is supported in a floating manner relative to the vehicle body frame 14 at six floating points F by using not-illustrated bushes and the like, for example. Moreover, in the comparative example, the first antivibration device 100a is rigidly fixed to the front cross member at corresponding fixed points R and the second antivibration device 100b is rigidly fixed to the rear cross member at corresponding fixed points R.

In the comparative example, when a suspension load G is inputted from a suspension lower arm to the sub-frame structure body, for instance, the suspension load G is received at the six floating points F (by the six bushes). As a consequence, support stiffness of the sub-frame structure body is diminished.

On the other hand, according to this embodiment as shown in FIG. 11B, when a suspension load G is inputted from a suspension lower arm to the sub-frame structure body 10, for instance, the suspension load G is received by both the vehicle body frame 14 and the sub-frame structure body 10. Thus, it is possible to increase support stiffness of the sub-frame structure body 10.

In this embodiment, by supporting the front cross beam 20, on which the first antivibration device 100a is placed, in a floating manner through the first bush 50 and the second bush 52 provided with the first elastic member 64 and the second elastic member 74, respectively, it is possible to achieve a vibration reduction effect that is similar to the case of supporting the entire sub-frame in a floating manner relative to the vehicle body frame 14.

Meanwhile, this embodiment is constructed by the simple structure in which the front cross beam 20 that is separately constructed is attached in the vehicle width direction to the end portions on the vehicle front side of the right and left side members 16. Thus, it is possible to readily use an existing sub-frame structure body.

Moreover, this embodiment can adopt a stopper structure in which the end portions on the vehicle front side of the right and left side members 16 come into contact with the first bushes 50 and the second bushes 52 in the state of being sandwiched by the fork pieces 48 (the upper pieces 48*a* and the lower pieces 48*b*) opposed vertically to the front cross beam 20, while not requiring a conventional separate plate to come into contact with the bushes. Thus, it is possible to reduce the number of components and to simplify assembly man-hour.

Furthermore, this embodiment can reduce the vibration transmission to be transmitted from the engine E by allowing the second floating mechanism 30 to use the total mass of the second antivibration device 100*b* and the attachment bracket 32 as the mass component subject to floating, and can also reduce the resonance frequency ($f_0$) and thus increase the vibration cutoff region (see FIG. 10A).

In addition, this embodiment can set a spring force of the first bush 50 and a spring force of the second bush to be different from each other when arranging the multiple bushes, and also adjust the spring forces of the first bush 50 and the second bush 52, for example.

Further, this embodiment is constructed by the simple structure in which the multiple third bushes 54 are provided between the attachment bracket 32 and the rear cross member 18. Thus, it is possible to readily use the existing sub-frame structure body.

Still further, according to this embodiment, it is possible to effectively achieve the vibration reduction effect even when it is difficult to support the sub-frame structure body 10 in a floating manner relative to the vehicle body frame 14 due to a layout relation with a vehicle power plant room (an engine room) to house the engine E and the like, for example.

REFERENCE SIGNS LIST

10: sub-frame structure body
14: vehicle body frame
16: right and left side members (longitudinal members)
18: rear cross member (lateral member)
20: front cross beam (lateral member)
32: attachment bracket
48: fork piece (opposed surfaces)
50: first bush (elastic body)
52: second bush (elastic body)
54: third bush (other elastic body)
100*a*: first antivibration device (antivibration device)
100*b*: second antivibration device (antivibration device)
E: engine (vehicle power plant)

The invention claimed is:

1. A sub-frame structure comprising:
a longitudinal member extending in a vehicle front-rear direction; and
a lateral member extending in a vehicle width direction,
the sub-frame structure being configured to support a vehicle power plant through antivibration devices, to support a suspension member, and to be supported by a vehicle body frame, wherein:
the suspension member is rigidly fixed to the longitudinal member,
the longitudinal member is rigidly fixed to the vehicle body frame,
at least one of the antivibration devices is mounted on the lateral member, and
an elastic body is provided in order to support the lateral member in a floating manner relative to the longitudinal member,
and wherein the longitudinal member is attached in such a way as to be sandwiched by opposed surfaces of the lateral member.

2. A sub-frame structure comprising:
a longitudinal member extending in a vehicle front-rear direction;
a lateral member extending in a vehicle width direction,
the sub-frame structure being configured to support a vehicle power plant through antivibration devices, to support a suspension member, and to be supported by a vehicle body frame,
the sub-frame structure further comprising an attachment bracket configured to attach at least one of the antivibration devices to the lateral member, wherein:
the suspension member is rigidly fixed to the longitudinal member,
the longitudinal member is rigidly fixed to the vehicle body frame,
at least one of the antivibration devices is mounted on the lateral member, and
an elastic body is provided in order to support the lateral member in a floating manner relative to the longitudinal member,
and wherein another elastic body is provided between the attachment bracket and the lateral member in order to support the attachment bracket in a floating manner.

* * * * *